United States Patent [19]
Haehnel et al.

[11] 3,720,054
[45] March 13, 1973

[54] METHOD AND APPARATUS FOR WIRE WINDING

[75] Inventors: Rudolf H. Haehnel, West Lawn; John L. Wily, Reading, both of Pa.

[73] Assignee: North American Rockwell Corporation, Pittsburgh, Pa.

[22] Filed: Sept. 7, 1971

[21] Appl. No.: 177,979

[52] U.S. Cl. .............................57/9, 57/13, 57/15, 57/160
[51] Int. Cl. .............................B65h 81/08
[58] Field of Search.................57/3, 6, 9, 11, 13-15, 57/55, 156, 160, 161

[56] References Cited

UNITED STATES PATENTS

| | | | |
|---|---|---|---|
| 2,488,579 | 11/1949 | Bunch | 57/13 |
| 2,967,390 | 1/1961 | McCormick | 57/11 |
| 3,037,343 | 6/1952 | Haas et al. | 57/9 |
| 3,142,145 | 7/1964 | Blanchard | 57/9 |
| 3,187,494 | 6/1965 | Fuller | 57/9 |
| 3,234,721 | 2/1966 | Carter | 57/13 |
| 3,236,039 | 2/1966 | Fletcher, Jr. et al. | 57/9 X |

*Primary Examiner*—John Petrakes
*Attorney*—John R. Bronaugh et al.

[57] ABSTRACT

An improved method of winding a plurality of wires about a hose carcass in helical convolutions having a predetermined winding tension which comprises mounting a hose carcass for movement parallel to its longitudinal axis, rotating in unison a plurality of wire supply bobbins and preform roller pins about said axis, withdrawing a single wire from each bobbin, guiding it along a path extending toward said axis, independently tensioning each wire to have a predetermined uniform withdrawal tension, attaching the wires to the carcass and longitudinally advancing the carcass to simultaneously pull the wires from their bobbins and progressively wind the wires in helical convolutions about the carcass, wrapping each wire 360° around a preform roller pin curvature having a preselected diameter less than said hose carcass diameter to impart to each wire a permanent convoluted shape prior to winding it on the carcass, and selecting that combination of uniform wire withdrawal tension and roller pin curvature diameter which produces said predetermined winding tension.

An improved and novel apparatus for carrying out the above-described winding method is also provided.

9 Claims, 5 Drawing Figures

PATENTED MAR 13 1973　　3,720,054

METHOD AND APPARATUS FOR WIRE WINDING

BACKGROUND AND SUMMARY OF INVENTION

This invention relates to the winding of multiple flexible wire strands about a hose carcass to act as a reinforcing ply. The invention includes both a novel wire winding method and wire winding machine for wrapping multiple strands of wire in parallel helical convolutions about the hose carcass.

This invention has particular application in the reinforcing of rubber hose used in high pressure hydraulic systems. The winding of as many as 180 or more strands of fine high tensile strength steel wire into parallel helical strands has presented many manufacturing problems. Chief among these are that when the resulting hose is cut to assemble a fitting to it a wild flaring of the wire ends occurs along the plane of severence. It is known to avoid the flared end problem by preforming each wire, by bending it around a curvature under tension prior to winding it around the hose. The wire is preformed so that, were the wire permitted to relax freely, it would form itself into a helix. The manner in which preforming is accomplished is highly relevant to the degree of final winding tension imparted to the wire wound on the hose surface. It is undesirable to wind a wire about a rubber hose carcass too tightly, as the wire may cut into the hose material and damage it. It is also undesirable to wind highly tensioned wire about a hose carcass formed with a flexible mandrel as later removal of the mandrel becomes more difficult.

Another problem encountered in wire winding is the difficulty encountered in laying multiple wires in a ply of uniform convolutions. The convolutions must be laid with accuracy and consistency or individual coils may override adjacent coils causing irregularities and weak spots in the reinforcing ply.

In one prior art wire winding machine, the preforming means comprises a plate having a large central hole and a plurality of small holes arranged on a common pitch circle concentric with the large hole. The hose is supported so that it passes through the central hole, the plate being in a plane perpendicular to the hose axis. A ring of circular section is arranged to lie parallel to the plate and concentric with the pitch circle adjacent the small holes. Stationary spools supply tensioned wires which pass through the small holes, over the ring and are then reversely bent over a guide bushing boss before passing through the guide bushing and being wrapped around the hose which also passes through the guide bushing. The hose is rotated as it is longitudinally advanced to pull the wires over the ring and guide boss to give each wire a helical preform.

In a single wire winding machine, a single wire is preformed by passing it around a roller prior to being wound around the hose by rotating a wire spool and the roller relative to the hose axis. Tensioning rollers are placed between the spool and roller against which the wire passes before reaching the preform pins. The roller diameter is made smaller than the hose diameter to impart permanent deformation.

It is an object of this invention to provide an improved multiple wire winding machine in which consistent helical convolutions of preformed wires are formed and accurately aligned in parallel side-by-side relationship around the hose carcass circumference.

It is a further object of this invention to provide a method of controlling the winding tension of wire of a given diameter on a given diameter hose carcass by selecting a proper combination of initial wire bobbin withdrawal tension and preform pin diameter size. Normally, that combination of initial tension and preform pin diameter size which produces preformed wire having the lowest winding tension would be selected.

It is a still further object of this invention to provide a simplified bobbin braking mechanism which is inexpensive to manufacture and assemble, reliable in operation, easily adjustable without special tools and allows independent adjustment of wire tension.

It has been found that the winding tension will vary with different hose carcass diameters, different wire diameters, different preform pin diameters and different wire withdrawal tensions from the supply bobbins. Although the hose carcass diameter and wire diameter of a particular hose product are fixed, it is possible to control the winding tension by selecting a proper combination of withdrawal tension and preform pin diameter size. Generally, the combination of a low initial tension and a particular pin diameter smaller than the hose carcass diameter results in a low winding tension.

In accordance with this invention a plurality of parallel side-by-side helical convolutions of reinforcing wire are wound to have a predetermined winding tension about a hose carcass of selected diameter. The hose carcass is mounted for movement in a direction parallel to its longitudinal axis while a plurality of wire supply bobbins and preform pins are rotated in unison about said axis. The bobbins and preform pins are also mounted for rotation about their own axes. A single wire is withdrawn from each bobbin and guided along a path extending toward the hose carcass. Each wire supply bobbin is independently braked to place its wire under a preselected uniform tension. Each wire is attached at circumferentially spaced positions along the carcass prior to the carcass being longitudinally advanced relative to the bobbins. Longitudinally advancing and rotating the hose carcass simultaneously pulls the wires from their supply bobbins and progressively winds them in parallel helical convolutions about the hose carcass. Prior to reaching the hose carcass, each wire is wrapped 360° around an individual freely rotatable preform pin curvature having a preselected diameter less than the hose carcass diameter to impart to each wire a permanent convoluted shape. That combination of uniform wire withdrawal tension and preform pin curvature diameter is selected which imparts the predetermined winding tension.

The invention will further be described with reference to the accompanying drawings in which one form of apparatus constructed in accordance with and embodying the invention and which is useful for practicing the method of this invention is illustrated.

DESCRIPTION OF THE INVENTION

Figure 1:
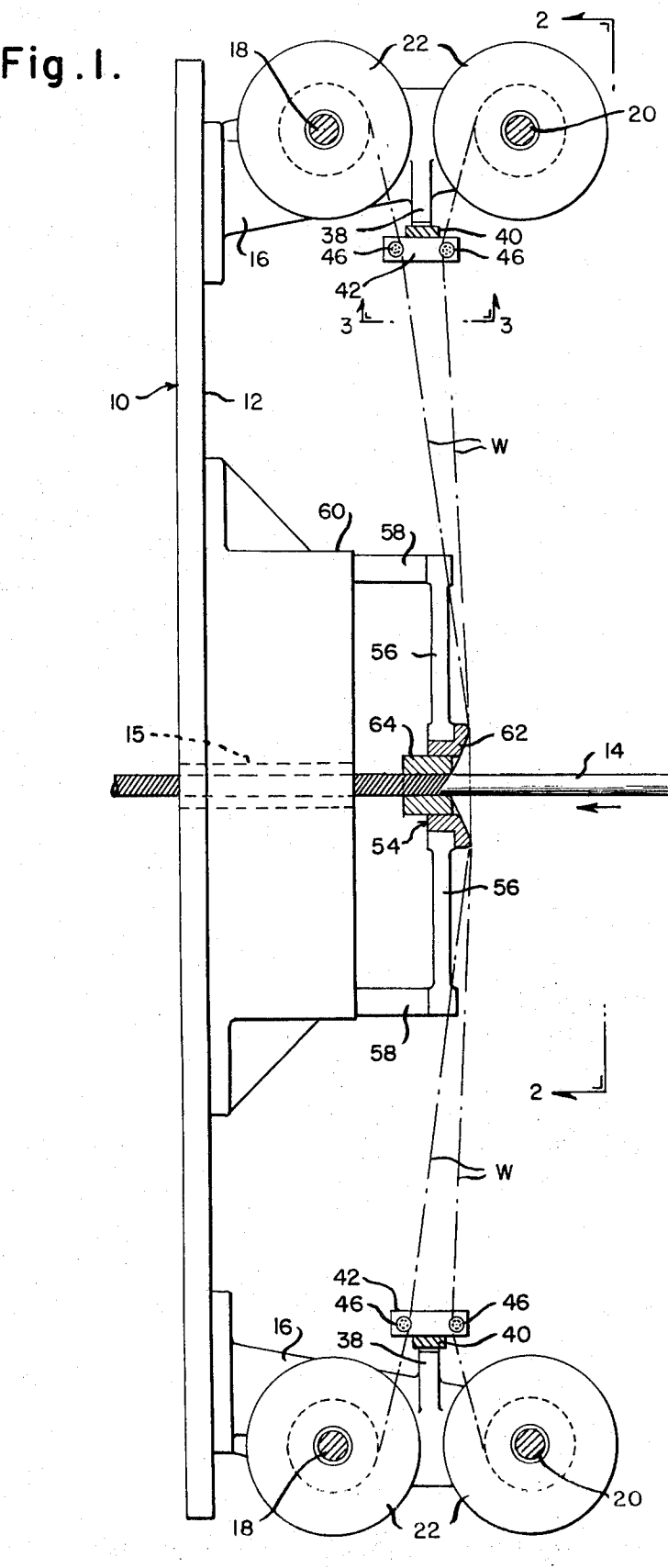
FIG. 1 is a diagrammatic side elevation partly in section illustrating the winding apparatus and certain details thereof.
Figure 2:
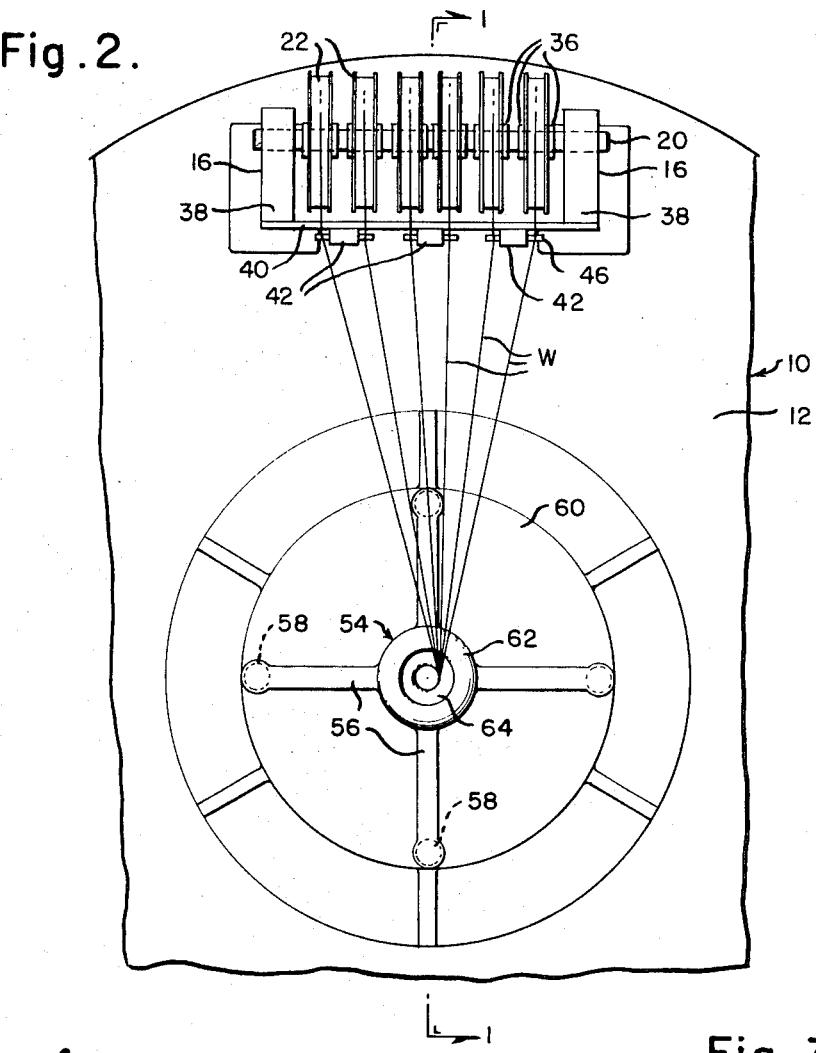
FIG. 2 is a fragmentary front view taken along the line 2—2 of FIG. 1.

Referring to FIGS. 1 and 2, a turntable 10 is shown which is rotatably mounted in the main frame (not shown) of the machine by suitable means (not shown). The turntable comprises an annular support deck 12 having a central aperture 15 through which a hose carcass 14 is advanced. The support deck 12 mounts a plurality of pairs of parallel support arms 16 spaced radially about the axis of the hose carcass. In the preferred form, each pair of support arms 16 mounts the ends of two fixed wire bobbin shafts 18 and 20 in U-shaped recesses. Detent means (not shown) secure the bobbin shafts in the recesses. As best seen in FIG. 2, each bobbin shaft supports a group of wire supply bobbins 22. Six bobbins constitute a group in the preferred form. The bobbin shafts 18 and 20 lie in respective planes perpendicular to the hose carcass axis.

Figure 4:
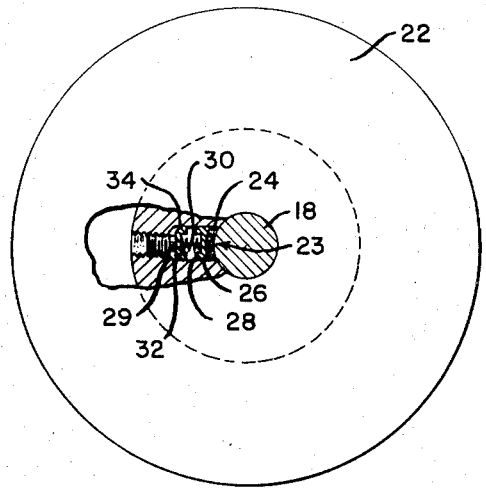
FIG. 4 is an enlarged view of the upper left bobbin shown in FIG. 1 with parts broken away and partially in section to show a bobbin braking mechanism.

Referring to the bobbin 22 shown in FIG. 4, a bobbin brake mechanism 23 is shown. This mechanism includes a brake shoe 24 mounted in the bobbin for rotation therewith about shaft 18. Brake shoe 24 has a concave braking surface which forms a movable part of the centrally located internal cylindrical surface forming the hub opening through which shaft 18 extends. Integrally mounted on the back surface of brake shoe 24 is a backing member 26 having three spring locating recesses 28 therein. Brake shoe 24 and backing member 26 are mounted in a radially extending tapped recess 29 in the bobbin hub. A compression spring 30 has one end located in a recess 28 and the other end located in a corresponding recess 32 formed in the head of an adjustable screw member 34 to thereby bias the brake shoe against shaft 18. Three compression springs 30 are used in the preferred form for each bobbin.

Movement of screw member 34 axially along recess 29 allows adjustment of the braking force exerted by the brake shoe 24. Each bobbin on the winding machine has one of the above described independently adjustable braking mechanisms 23 carried in its hub.

In the embodiment shown, six bobbins are mounted per shaft with a total of 24 shafts or 144 bobbins. It is an important feature of this invention that only one wire is prewound on each bobbin. Multiple wires have a tendency to pay off from a single bobbin under unequal tension which adversely affects the uniformity of the preformed helical strands. It is apparent that the number of wire supply bobbins mounted may be varied depending on the number of reinforcing strands of wire desired to be wrapped about the hose carcass. As shown in FIG. 2, annular spacers 36 which engage precut grooves on each bobbin shaft are placed on either side of each bobbin to separate adjacent bobbins and limit axial movement of the bobbins.

Rigidly fixed to each support arm 16 at a position between shafts 18 and 20 is an arm 38 which extends towards the hose carcass at a right angle from its support arm. A support bar 40 is rigidly attached at its ends to the innermost ends of a pair of arms 38 and is mounted to extend parallel to the axes of shafts 18 and 20. Support bar 40 is approximately of the same length as the shafts 18 and 20. Three short cross bars 42 are fixedly mounted at spaced intervals along the length of support bar 40.

Figure 3:
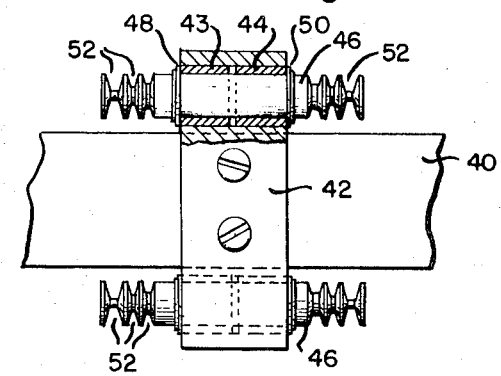
FIG. 3 is a detailed view of the preform roller pins in partial section taken along the line 3—3 of FIG. 1.

As best seen in FIG. 3, each cross bar 42 has a bore hole in each end which journals a set of hollow needle bearings 43 and 44 in abutting relationship. Each preform roller pin 46 has a central portion mounted in a bore hole with said needle bearing set axially surrounding the central portion of the preform pin. Retaining flanges 48 and 50 are mounted on each preform pin outside the ends of each bore hole to restrict axial movement of the preform pin. Each preform pin end has a set of different sized diameter grooves 52 with the groove sets on each end being identical. It will be appreciated that the preform pins are easily changeable for preform pins having groove diameters of other sizes.

Figure 5:
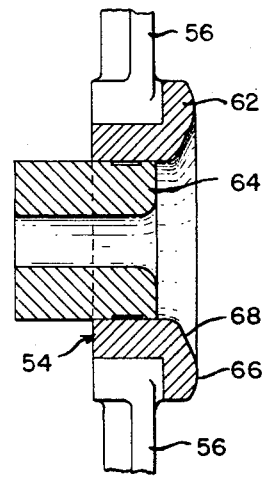
FIG. 5 is an enlarged view partly in section of the guide bushing shown in FIG. 1.

As best seen in FIGS. 1 and 5, a female bushing 54 is mounted to rotate on turntable 10 by means of support arms 56. Support arms 56 extend radially from bushing 54 and have their outer ends attached to brackets 58. Brackets 58 extend parallel to the axis of the hose carcass and are rigidly attached to a turntable bearing housing 60 mounted on the support deck 12.

Bushing 54 comprises an outer guide bushing 62 and an inner recessed guide bushing 64 attachably mounted in the inner cylindrical surface of outer bushing 62. The inner diameter of guide bushing 64 is slightly larger than the diameter of the hose carcass 14 to allow free passage of the wire wrapped hose carcass. Another guide bushing 64 having a different sized inner diameter may be inserted in bushing 62 to allow passage of a different diameter hose carcass.

Outer guide bushing 62 has an initial wire engaging surface 66 of large radius which guides the individual wires W over it and unto an adjacent funnel shaped annular surface 68 extending at an angle of 65° with the hose carcass axis. Surface 66 has a sufficiently large radius to blend smoothly with surface 68. The 65° angle of slope is a preferred angle of approach; however, other angles of approach could also be used. It is important that the wires do not pass over too sharp a guide surface after the preform helical convolutions have been imparted to the wire.

Inner bushing 64 has a smoothly rounded mouth opening which blends into its internal cylindrical surface. Bushing 64 is located axially within the cylindrical inner wall of outer guide bushing 62 at a wire contacting position which slightly changes the angle of the wire path from 65° to 54° with respect to the hose carcass axis. It is normal in the wire hose reinforcing art to wrap wire about a hose carcass at an angle of between 54° and 56° with respect to the hose axis. Guide bushing 54 is effective in simultaneously training up to and over 200 wires into parallel side-by-side helical convolutions about the hose carcass.

The angle of the wire path from the preform pins to the bushing surface 66 is substantially perpendicular to the hose axis with an angle of approach to the hose axis being between 81° and 87° as shown in FIG. 1. Wire withdrawn from bobbins mounted on shafts 18 would have an 81° angle of approach. It will be observed that after the wire is preformed it is twisted substantially 90° in passing from the preform pins to the guide bushing 54 to align it in a plane for placement about the hose carcass axis.

To obtain a reinforced hose product of given hose carcass diameter and wire diameter the following sequence of operation is followed. The requisite number of bobbins needed to supply the desired number of individual wire strands is mounted in groups of six on shafts 18 and 20 at radial positions around the hose carcass axis. A uniform braking tension on each bobbin is set at between ½ and 6 pounds. Each wire W is then withdrawn from its supply bobbin and wrapped once about the closest preform pin end. The particular preform pin groove 52 about which the wire is wrapped is selected in a manner yet to be described. Each wire is then guided over guide bushings 62 and 64 along the surfaces previously set forth. Each wire is then fastened to the hose carcass at circumferentially spaced positions thereon. Turntable 10 is then rotated to wrap the wires about the hose carcass. The direction of rotation depends on whether a ply of left-handed or right-handed thread is desired. Hose carcass 14 is advanced along its longitudinal axis at a preselected uniform rate to thereby simultaneously pull the attached wires from their supply bobbins. Each wire is progressively wound in parallel helical convolutions about the hose carcass. A permanent convoluted shape is imparted to each wire as it passes around a freely rotatable pin groove 52 prior to winding the wire about the hose carcass.

It is an important aspect of this invention that for a given hose carcass diameter and wire diameter a pin diameter can be selected which imparts both a permanent helical deformation and a low winding tension when used in conjunction with the teachings of this invention.

It has been found that winding tension varies with hose carcass diameter, wire diameter, preform pin diameter and initial wire tension prior to preforming. The following chart represents test results obtained using the herein-described apparatus with three different commonly used wire diameters. The "preform diameter" column refers to the outer diameter a helical coil would freely assume after being preformed. Normally, it is desired to have the "preform diameter" substantially match the hose carcass diameter. Although the hose carcass diameter and the wire diameter are predetermined for a given hose product, it is possible to control the winding tension through the proper selection of initial tension and preform pin diameter size. It will be noted that as the wire diameter increased, the effect of varying the initial tension decreased. Also, increased wire diameter caused the same sized preform pin diameter to impart a greater "preform diameter." Thicker wire resists deforming to a greater extent than thinner wire. Preforming tighter preform diameters on thicker wires resulted in higher final wire tension.

PERFORMING CHARACTERISTICS

| Wire Dia. (Inches) | Preform Dia. (Inches) | Initial Tension (Lbs.) | Pin Dia. (Inches) | Final Tension (Lbs.) |
|---|---|---|---|---|
| 0.012 | 11/16 | 1/2 | 1/8 | 1 3/4 |
|  | 3/4 | 1/2 | 3/16 | 1 3/4 |
|  | 3/4 | 1 1/2 | 3/16 | 2 3/4 |
|  | 3/4 | 1 1/2 | 1/8 | 4 1/2 |
|  | 3/4 | 3 | 1/8 | 6 |
|  | 7/8 | 3 | 3/16 | 5 1/2 |
|  | 15/16 | 1/2 | 1/4 | 1 1/4 |
|  | 1 | 1 1/2 | 1/4 | 3 |
|  | 1 | 3 | 1/4 | 4 1/2 |
|  | 1 1/4 | 1/2 | 3/8 | 2 |
|  | 1 3/4 | 1 1/2 | 3/8 | 3 |
|  | 2 1/2 | 3 | 3/8 | 5 1/2 |
| 0.022 | 1 1/4 | 1/2 | 1/8 | 13 |
|  | 1 1/4 | 1 1/2 | 1/8 | 15 1/2 |
|  | 1 5/16 | 3 | 1/8 | 22 3/4 |
|  | 1 3/8 | 1/2 | 1/4 | 5 3/4 |
|  | 1 3/8 | 1 1/2 | 1/4 | 7 |
|  | 1 3/8 | 1/2 | 3/16 | 8 |
|  | 1 3/8 | 1 1/2 | 3/16 | 9 1/2 |
|  | 1 3/8 | 3 | 3/16 | 11 1/2 |
|  | 1 7/16 | 3 | 1/4 | 10 1/2 |
|  | 1 9/16 | 1/2 | 3/8 | 4 1/2 |
|  | 1 5/8 | 1 1/2 | 3/8 | 6 |
|  | 1 5/8 | 3 | 3/8 | 8 |
| 0.030 | 1 9/16 | 2 | 1/4 | 16 |
|  | 1 9/16 | 3 | 1/4 | 17 |
|  | 1 5/8 | 1 1/2 | 1/4 | 15 |
|  | 1 13/16 | 1 1/2 | 3/8 | 12 |
|  | 1 7/8 | 3 | 3/8 | 12 |
|  | 1 15/16 | 2 | 3/8 | 12 |
|  | 2 | 2 | 1/2 | 8 |
|  | 2 1/8 | 3 | 1/2 | 8 |
|  | 2 1/4 | 1 1/2 | 1/2 | 8 |
|  | 2 1/2 | 3 | 5/8 | 7 |
|  | 2 1/2 | 2 | 5/8 | 7 |
|  | 2 1/2 | 1 1/2 | 5/8 | 7 |

For a known wire diameter, hose carcass diameter, turntable rotation speed and hose carcass advance speed, it is possible to control wire winding tension by selecting that combination of initial tension and preform pin diameter size which produces an optimum final winding tension. By adjusting the position of screw member 34 of the bobbin braking mechanism initial wire tension can be varied from ½ to 3 pounds.

A multiplicity of different diameter size grooves 52 are provided on each preform pin to save time by not having to change preform pins. In the preferred form, both ends of each preform pin are used to reduce the total number of preform pins and mounting structure needed.

It is to be understood that the above detailed description of the apparatus and method of the present invention is intended to disclose an embodiment thereof to those skilled in the art, but that the invention is not to be construed as limited to its application to the details of construction, arrangement of parts, and steps of operation illustrated in the accompanying drawings, since the invention is capable of being practiced and carried out in various ways without departing from the spirit of the invention. The language used in the specification relating to the method steps, operation and function of the elements of the invention is employed for purposes of description and not of limitation, and it is not intended to limit the scope of the following claims beyond the requirements of the prior art.

What is claimed is:

1. The improved method of winding a plurality of wires about a hose carcass in parallel side-by-side helical convolutions having a predetermined winding tension which comprises mounting a hose carcass of a selected diameter for movement parallel to its longitudinal axis, rotating in unison a plurality of wire supply bobbins and preform pins about said axis, mounting said bobbins and preform pins to be rotatable about their own axes, withdrawing a single wire of a predetermined diameter from each of said wire supply bobbins, guiding each withdrawn wire along a path extending toward said hose carcass axis, independently placing each wire under a preselected uniform tension as it is withdrawn from its wire supply bobbin, attaching said withdrawn wires to circumferentially spaced positions on said carcass, longitudinally advancing said hose carcass relative to said bobbins at a uniform rate to simultaneously pull said attached wires from their supply bobbins and progressively wind said wires in parallel helical convolutions about said hose carcass, wrapping each wire under tension substantially 360° around a respective freely rotatable preform pin curvature having a preselected diameter less than said hose carcass diameter to impart to each wire a permanent convoluted shape prior to winding it on said hose carcass, and selecting that combination of uniform wire withdrawal tension and preform pin curvature diameter which produces said predetermined winding tension.

2. The improved method of winding a plurality of parallel side-by-side helical convolutions of reinforcing wire about a hose carcass which comprises mounting a hose carcass for movement parallel to its longitudinal axis, rotating a plurality of wire supply bobbins about the hose carcass axis with the axes of said supply bobbins lying in a plane perpendicular to the hose carcass axis, rotating a plurality of preform roller pins in unison with said supply bobbins about the hose carcass axis with the axes of said preform roller pins parallel to the axes of said supply bobbins, withdrawing a single wire from each of said wire supply bobbins and guiding it along a path extending toward said hose carcass axis, uniformly tensioning each wire to have a predetermined withdrawal tension, wrapping each wire while in said path substantially 360° around a respective preform roller pin to impart to each wire a permanent convoluted shape, thereafter passing said wires over a guide surface concentrically surrounding said hose carcass axis to change the path of said wires substantially 90° from the plane of preforming, attaching said wires to circumferentially spaced positions on said carcass, and longitudinally advancing said hose carcass relative to said bobbins to simultaneously pull each attached wire from its supply bobbin and wind said wires in parallel side-by-side helical convolutions about said hose carcass.

3. Improved apparatus for winding a plurality of parallel side-by-side helical convolutions of reinforcing wire about a hose carcass which comprises means for mounting a hose carcass for movement parallel to its longitudinal axis, a rotating support deck through which said hose carcass passes, a plurality of single wire supply bobbins mounted on said deck for rotation about the hose carcass axis with the axes of the supply bobbins lying in a plane perpendicular to the hose carcass axis, a plurality of preform roller pins mounted on said support deck for rotation about the hose carcass axis with the axes of said preform roller pins mounted parallel to said supply bobbin axes, adjustable tensioning means acting on said wire supply bobbins to independently and uniformly tension each wire, said preform roller pins each having a plurality of curvatures of different diameters around one of which curvatures wire from an adjacent bobbin is caused to pass to thereby impart to each wire a permanent convoluted shape, guide means attached to said support deck, said guide means including an annular guide member having a central opening through which said hose carcass extends, said wires passing over a surface of said guide member and into engagement with said hose carcass at circumferentially spaced positions thereon, means for rotating said support deck relative to said hose carcass axis, and means for longitudinally advancing said hose carcass relative to said rotating support deck at a uniform rate to simultaneously pull each wire engaging said hose carcass from its supply bobbin and wind said wires in parallel helical side-by-side convolutions about said hose carcass.

4. The apparatus as defined in claim 3 wherein said wire supply bobbins are mounted in groups on fixed shafts and wherein said adjustable tensioning means comprises a spring biased brake shoe mounted on each bobbin and acting to brake the rotation of its bobbin about the fixed shaft of said group of bobbins.

5. The apparatus as defined in claim 3 wherein each of said preform roller pins has a plurality of curvatures of different diameters to allow selection of different sized permanent convoluted shapes.

6. The apparatus as defined in claim 3 wherein said preform roller pins are mounted between said plurality of supply bobbins and an additional plurality of one wire supply bobbins mounted on said deck with the axes of the additional supply bobbins lying in a second plane perpendicular to the hose carcass axis.

7. Improved apparatus for winding a plurality of parallel side-by-side helical convolutions of reinforcing wire with a predetermined winding tension about a hose carcass which comprises means for mounting a hose carcass for movement parallel to its longitudinal axis, a rotating support deck, a plurality of one wire supply bobbins mounted to rotate relative to shafts attached to said support deck for rotation about the hose carcass axis, means for rotating said support deck about said hose carcass axis, guide means attached to said support deck for guiding the wire from each bobbin along a path extending toward said hose carcass axis, said guide means including a member having a central opening closely surrounding said hose carcass and through which each wire passes and is guided into engagement with said hose carcass at circumferentially spaced positions thereon, means for longitudinally advancing said hose carcass relative to said support deck at a uniform rate to simultaneously pull each wire engaging said hose carcass from its supply bobbin and wind said wires in parallel helical convolutions about said hose carcass, and winding tension control means attached to said support deck, said winding tension control means including an adjustable spring biased brake shoe carried on each bobbin for braking the rotation of its bobbin about its shaft and a plurality of preform roller pins, each of said preform roller pins being freely rotatable and having a plurality of curvatures of different diameters around one of which diameters wire withdrawn from a bobbin is caused to pass to thereby impart to each wire a permanent convoluted shape.

8. The apparatus as defined in claim 7 wherein the diameter of said hose carcass is greater than the said preform roller pin curvature diameters.

9. The apparatus as defined in claim 7 wherein said preform roller pins are centrally mounted in bearing means and said curvatures of different diameters are annular grooves adjacent the ends of each pin.

* * * * *